UNITED STATES PATENT OFFICE 2,166,123

TERMINATION OF REST PERIOD OF DECIDUOUS PLANTS

Alfred M. Boyce, Riverside, William H. Chandler, Berkeley, and Marston H. Kimball, Alhambra, Calif., dedicated by assignment to the Government and the People of the United States of America No Drawing. Application January 19, 1938, Serial No. 185,694

11 Claims. (Cl. 47—58)

We hereby dedicate the invention herein described to the free use of the Government and People of the United States, such dedication to take effect upon the granting of a patent to us.

This invention concerns a method for hastening the termination of the rest period and stimulating the bud development of deciduous plants, the chilling requirements of which have been incompletely satisfied.

Deciduous trees have certain chilling requirements necessary for their normal budding, blossoming, and fruit-setting. Where these requirements are not completely satisfied, walnut, apple, pear, peach, apricot, and similar species are subject to irregular behavior, the buds thereon failing to develop and open normally. After warm winters the interval between the appearance of first flowers and leaves and the complete blooming and foliation of deciduous fruit trees may be unduly extended, e. g. for as long as four months, with so few leaf buds maturing that the branches and fruit are not properly shaded and are subject to sun scald with a resultant poor yield of fruit and tree injury. In other instances, many blossom buds drop unopened from the tree and the remainder open over an extended period of time, whereby a reduced set of fruit is obtained, due to difficulties in pollination, etc. The above condition, furthermore, leads to unusual problems in pest control, since the calyx spray for codling moth and similar seasonal insecticidal applications cannot be successfully undertaken when blossoms and/or fruit in varying stages of development are present on such trees as apple, pear, or walnut.

Oils, such as lubricating and raw linseed oils, in certain instances, have been found to stimulate the blooming and foliation of some deciduous tree species, when applied thereto at concentrations approaching 5 per cent by weight in aqueous emulsion. While bud development is sometimes hastened by such treatment, all too frequently the open blossoms fall from the tree without setting fruit. Furthermore, commercial control of aphid infestation is not necessarily accomplished by the application, and undesirable twig and branch injury may be caused by the oil. The application of conventional oil emulsions to deciduous trees has not proven generally satisfactory for terminating rest period and promoting normal tree behavior.

We have discovered that dinitro-phenol compounds can be employed to hasten the termination of the rest period of deciduous trees when the chilling requirements of the trees have been but partially satisfied. The dinitro-phenol compound may be applied to the tree in any convenient manner during the rest period, the preferred method of application consisting of spraying the branches of the dormant tree with a relatively small amount of an oil-water emulsion composition comprising the phenolic material dissolved therein. Such spraying causes the rest period of the treated tree to be terminated earlier than would otherwise occur, and stimulates the tree or plant whereby the buds thereon develop normally with uniform blooming and foliation and increased fruit set. Furthermore, scale and aphid infestations are substantially completely controlled by this treatment.

In carrying out this embodiment of our invention, from 0.5 to 6.0 per cent by weight of the dinitro-phenol compound may be dissolved in a suitable oil, and from 1 to 4 per cent of this solution emulsified with the required amount of water in any suitable manner. The amount of the phenolic compound dissolved in the oil, the percentage of the combined oil-toxic solution employed in the emulsion, and the time of application with respect to the normal foliation or blossoming period are all dependent upon the tree variety concerned, the particular dinitro-phenolic compound employed, and the tolerance of the tree variety therefor. The application of an aqueous spray material comprising 2 per cent by weight of an oil solution containing 3 per cent of the dinitro-compound to the tree from 2 to 12 weeks or more prior to its normal blossoming time has been found effective. The "normal blossoming time" varies with locality but in any instance is that period over which unsprayed trees habitually foliate or blossom.

Any suitable oil may be employed in the above composition, although a petroleum oil of the dormant type, having an unsulphonatable residue of at least 50 per cent, is preferred. Bentonite, casein, metallic caseinates, blood albumen, glyceryl oleate, sulphonated hydrocarbons, and similar materials may be used as emulsifiers and/or wetting agents in the composition. If desired, acidizing and buffering agents such as oxalic acid, aluminum sulphate, and the like, may be employed in the emulsion to regulate the pH thereof and consequently the solubility of the phenolic ingredient in the aqueous phase.

Among the dinitro-phenolic compounds which may be employed to hasten the termination of the rest period of deciduous trees are those compounds having the formula

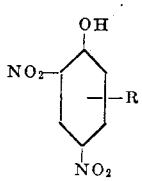

wherein R represents an alkyl, or cycloalkyl radical.

Oil emulsion compositions containing representative members of the above group of compounds have been found to stimulate bud development and/or fruit setting when applied to such tree varieties as Royal apricot, Champion peach, Millers late peach, Mayflower peach, Alexander peach, George IV peach, Rochester peach, Elberta peach, Terry plum (American), Methly plum (Japanese), Seckell pear, Winter Bartlett pear, Delicious apple, Winter Banana apple, McCoun apple, Eureka walnut, English Morello cherry, various ornamentals, and the like.

The following examples set forth certain specific embodiments of our invention but are not to be construed as limiting the same:—

*Example 1*

3 parts by weight of 2,4-dinitro-6-cyclohexyl-phenol was dissolved in 97 parts of lubricating oil having an unsulphonatable residue of 82%, a Saybolt viscosity of 99–100 seconds, and a boiling range of 606°–742° F. 2 parts by weight of this solution was vigorously agitated in a spray tank with 98 parts of an approximately 0.008% dispersion of blood albumen spreader in water containing 2 ounces of oxalic acid per 100 gallons thereof. The resulting quick-breaking emulsion was sufficiently acid in reaction that the solubility of the dinitro-phenol compound in the water phase was reduced.

The final mixture, containing 2 per cent by weight of a 3 per cent solution of 2,4-dinitro-6-cyclohexyl-phenol in oil, was sprayed on mature Royal apricot trees, the chilling requirements of which had been but partially satisfied, at a period 2½ to 3 weeks prior to the normal blooming time. These sprayed trees were subsequently examined from time to time and their flower, leaf and fruit development compared with that shown by unsprayed controls.

28 days following the application of the spray material, profuse bloom was observed on the treated trees with very few of the flower buds shedding. Both leaf and unopened flower buds were firmly attached to the tree. The unsprayed control trees showed but scattering bloom and those flower buds not already opened were loosely attached to, and in many instances falling from the tree. 48 days after the spray application, unusually advanced leaf development and a heavy set of fruit was observed on the sprayed trees. No injury resulted from the spray application. Control trees showed scant fruit set with a large percentage of unopened flower buds fallen from the tree and leaf development at least 10 days behind that of the sprayed trees. At the end of the growing season each sprayed tree yielded an average of 5.1 50-pound boxes of fruit while control trees averaged only 0.9 box of fruit.

In a similar manner emulsion compositions were prepared containing 1% of a 3% solution, and 1%, 2%, and 4% of a 4% solution of the 2,4-dinitro-6-cyclohexyl-phenol in oil. These compositions were applied to mature Royal apricot trees substantially as described above. No commercial injury was observed from the application of these compositions and each hastened the termination of the rest period of the sprayed trees.

*Example 2*

An emulsion composition containing 2% of a 3% by weight solution of 2,4-dinitro-6-cyclohexyl-phenol in oil was prepared as described in Example 1, and applied to one side of a three-year old Seckell pear tree a number of weeks prior to the normal blooming and foliation thereof. 40 days following the spray application the buds on the treated half of the tree were swelled and ready to open, while the unsprayed portion of the tree showed no bud development. 48 days following the application all of the terminal and lateral leaf buds on the sprayed half of the tree had opened and developed into leaves from ½ to 1 inch in width, while buds on the control portion of the tree had only started to swell. A significant difference in foliage development between control and sprayed tree areas persisted throughout the growing season with 25% of the lateral buds on the unsprayed portion of the tree failing to open.

*Example 3*

A similar experiment was carried out on a three-year old Winter Banana apple tree. 37 days following the application of the composition described in Example 2, the sprayed half of the tree showed some leaf buds completely opened, while buds on the unsprayed portion had not yet started to swell. 48 days following application, the sprayed branches of the tree were in full bloom with both lateral and terminal buds completely leafed out. At this time the unsprayed portion of the tree showed whorls of leaves on a few twig terminals and a few partially opened terminal blossoms. A large percentage of the lateral buds on the unsprayed side of the tree failed to open throughout the growing season. The yield of fruit obtained from the sprayed side of the tree was substantially in excess of that borne by the unsprayed portion. No tree injury attributable to the spray application was observed.

*Example 4*

Mature Elberta peach trees were sprayed with an oil emulsion comprising 2% of a 3% solution of 2,4-dinitro-6-cyclohexyl-phenol in a dormant oil approximately 5 weeks prior to their normal blooming period. Other trees in the same orchard were sprayed with 2% of the same oil emulsified in water. The sprayed trees were periodically examined and their condition and rate of development compared to that shown by unsprayed controls.

After 38 days, those trees sprayed with the composition comprising the dinitro-phenol compound were in full bloom with leaf buds swelling and in many instances shedding their cases. Those trees sprayed with the conventional oil emulsion showed an occasional blossom with no stimulated development of the leaf buds. The unsprayed controls showed no tendency to terminate rest period. 41 days after spraying the trees to which the dinitro-cyclohexyl-phenol composition had been applied were completely foliated, with blossoms about gone. The trees sprayed with the conventional oil emulsion and the unsprayed controls were in the pre-pink stage, and showed no leaf development. 48 days following treatment, all the blossoms were gone on the trees sprayed with the dinitro-cyclohexyl-phenol composition, leaving what appeared to be a heavy fruit set. Leaves on these trees were from ½ to ¾ inch in width. The oil-sprayed and control trees were pink with blossoms, but showed substantially no leaf development. 60 days after application those trees sprayed with the dinitro-cyclohexyl-phenol composition were covered with mature leaves and green fruit. The oil-sprayed trees were beginning to put forth leaves, but showed scant fruit set. No fruit was set by the unsprayed controls, the leaves of which were just starting to break out of the bud cases. 75 days following spraying, fruit on the trees sprayed with the dinitro-cyclohexyl-phenol composition was approximately 1 inch in diameter. Fruit on the oil-sprayed trees was ½ inch in diameter, while the unsprayed controls showed no fruit development. Shortly prior to the above inspection, the orchard was attacked by peach leaf curl which resulted in the loss of about two-thirds of the leaves on the oil-sprayed and control trees. The trees sprayed with the oil-dinitro-cyclohexyl-phenol emulsion were substantially free from leaf curl damage. 90 days after spraying, the latter still retained substantially all of their original leaves. Control and oil-sprayed trees were found to have shed all of their original foliage and to be sending forth a fresh crop of leaves.

*Example 5*

The emulsion composition described in Example 2 was applied to walnuts of the Eureka variety between 6 and 7 weeks prior to their normal foliation period. At the same time other trees in the grove were sprayed with 2 per cent by weight of the same dormant oil emulsified in water. After 40 days the buds on the trees sprayed with the dinitro-cyclohexyl-phenolic composition were swollen and about to open. Buds on unsprayed controls and on those trees treated with the oil composition showed no development. 48 days following application, the buds on the dinitro-cyclohexyl-phenol treated trees were breaking from their cases and showed elongation of the catkins. At the same time, a few buds on the controls and oil-sprayed trees were slightly swelled. 60 days following the spray application, the trees sprayed with the composition containing dinitro-cyclohexyl-phenol were from 1 to 2 weeks in advance of the controls and of those trees originally sprayed with oil as regards leaf and pistillate and staminate flower development. Similar significant differences in the development and growth of the nut crop persisted throughout the growing season.

While the foregoing examples are concerned with the termination of the rest period of deciduous trees by the application thereto of dinitrophenol compounds dissolved in oil emulsion-spray compositions, this invention also contemplates the application of dusts, solutions, and suspensions of the dinitro-phenol compounds to accomplish the desired end. For example, the nitro-phenolic material may be ground or otherwise dispersed in a carrier such as talc, diatomaceous earth, oil-diatomaceous earth, wood flour, and the like, and thereafter dusted on the tree. Similarly, the dinitro-phenol compounds or their salts may be dissolved or dispersed in a suitable organic solvent or water and thereafter sprayed or otherwise applied to the tree surfaces during dormancy. In a like manner our new and improved method may be applied to related problems of breaking the rest period of tubers, bulbs, and deciduous plants.

Included within the scope of this invention is the use of such compounds as 2,4-dinitro-phenol, 2,6-dinitro-phenol, 2,4-dinitro-6-methyl-phenol, 2,5-dinitro-6-methyl-phenol, 2,6-dinitro-4-methyl-phenol, 2,4-dinitro-5-methyl-phenol, 2,4-dinitro-6-ethyl-phenol, 2,4-dinitro-6-isopropyl-phenol, 2,4-dinitro-6-normal-butyl-phenol, 2,4-dinitro-6-tertiary-butyl-phenol, 2,5-dinitro-6-tertiary-butyl-phenol, 2,4-dinitro-6-secondary-amyl-phenol, 2,4-dinitro-6-normal-hexyl-phenol, 2,4-dinitro-6-secondary-octyl-phenol, 2,4-dinitro-6-benzyl-phenol, 2,4-dinitro-6-phenylethyl-phenol, 2,4-dinitro-6-cyclopentyl-phenol, 2,4-dinitro-5-cyclohexyl-phenol, 2,4-dinitro-6-chloro-phenol, 2,6-dinitro-4-chloro-phenol, 2,4-dinitro-6-acetyl-phenol, 2,4-dinitro-6-phenyl-phenol, 2,4-dinitro-6-butenyl-phenol, 2,4-dinitro-5-toluidino-phenol, 2,4-dinitro-alpha-naphthol, and the like, to hasten the termination of the rest period of deciduous trees substantially as described.

While the sprays described in the foregoing examples are applied to the trees during the dormant or rest period, they are not essentially "dormant sprays" as the expression is generally understood. The usual "dormant application or spray" is applied to the tree immediately prior to blossoming or during the "pre-pink" stage for the control of such insects as aphis and scale. The present invention is concerned with the application of the dinitro-phenols, and particularly of sprays comprising them, to the growing plant during the non-vegetative or dormant period at a time sufficiently ahead of the normal blossoming time to accomplish the hastening of such blossoming, foliation, and termination of rest period.

Other modes of applying the principle of our invention may be employed instead of those explained, change being made as regards the method herein-disclosed, provided the steps stated by any of the following claims or the equivalent of such stated steps be employed.

We therefore particularly point out and distinctly claim as our invention:

1. In a method for hastening the termination of the rest period of deciduous trees, the chilling requirements of which have been incompletely satisfied, the step which consists of artificially stimulating the opening of the tree buds by the application of a relatively small amount of a dinitro-phenol compound to the tree from 2 to 12 weeks prior to the normal blossoming time.

2. In a method for hastening the termination of the rest period of deciduous trees, the chilling requirements of which have been incompletely satisfied, the step which consists of artificially stimulating the opening of the tree buds by the application of an oily composition comprising a relatively small amount of a dinitro-phenol compound to the tree from 2 to 12 weeks prior to the normal blossoming time.

3. In a method for hastening the termination of the rest period of deciduous trees, the chilling requirements of which have been incompletely satisfied, the step which consists of artificially stimulating the opening of the tree buds by the application of a composition comprising an insecticidal petroleum oil and a relatively small amount of a dinitro-phenol compound to the tree from 2 to 12 weeks prior to the normal blossoming time.

4. In a method for hastening the termination of the rest period of deciduous trees, the chilling requirements of which have been incompletely satisfied, the step which consists of artificially stimulating the opening of the tree buds by spraying a petroleum oil-water emulsion comprising a relatively small amount of a dinitro-phenol compound on the tree from 2 to 12 weeks prior to the normal blossoming time.

5. In a method for hastening the termination of the rest period of deciduous trees, the chilling requirements of which have been incompletely satisfied, the step which consists of artificially stimulating the opening of the tree buds by the application of a relatively small amount of a 2,4-dinitro-phenol compound to the tree from 2 to 12 weeks prior to the normal blossoming time.

6. In a method for hastening the termination of the rest period of deciduous trees, the chilling requirements of which have been incompletely satisfied, the step which consists of artificially stimulating the opening of the tree buds by spraying a petroleum oil-water emulsion comprising a relatively small amount of a 2,4-dinitro-phenol compound on the tree from 2 to 12 weeks prior to the normal blossoming time.

7. In a method for hastening the termination of the rest period of deciduous trees, the chilling requirements of which have been incompletely satisfied, the step which consists of artificially stimulating the opening of the tree buds by the application of a relatively small amount of a dinitro-phenol compound having the formula:

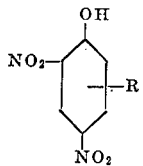

wherein R represents a hydrocarbon group selected from the class consisting of the alkyl and cycloalkyl radicals, to the tree from 2 to 12 weeks prior to the normal blossoming time.

8. In a method for hastening the termination of the rest period of deciduous trees, the chilling requirements of which have been incompletely satisfied, the step which consists of artificially stimulating the opening of the tree buds by spraying a petroleum oil-water emulsion comprising a relatively small amount of a dinitro-phenol compound having the general formula:

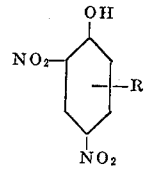

wherein R represents a hydrocarbon group selected from the class consisting of the alkyl and cycloalkyl radicals, to the tree from 2 to 12 weeks prior to the normal blossoming time.

9. In a method for hastening the termination of the rest period of deciduous trees, the chilling requirements of which have been incompletely satisfied, the step which consists of artificially stimulating the opening of the tree buds by the application of a relatively small amount of a 2,4-dinitro-6-cyclohexyl-phenol to the tree from 2 to 12 weeks prior to the normal blossoming time.

10. In a method for hastening the termination of the rest period of deciduous trees, the chilling requirements of which have been incompletely satisfied, the step which consists of artificially stimulating the opening of the tree buds by the application of a composition comprising a petroleum oil and relatively small amount of 2,4-dinitro-6-cyclohexyl-phenol to the tree from 2 to 12 weeks prior to the normal blossoming time.

11. In a method for hastening the termination of the rest period of deciduous trees, the chilling requirements of which have been incompletely satisfied, the step which consists of artifically stimulating the opening of the tree buds by spraying a petroleum oil-water emulsion comprising relatively small amount of 2,4-dinitro-6-cyclohexyl-phenol on the tree from 2 to 12 weeks prior to the normal blossoming time.

ALFRED M. BOYCE.
WILLIAM H. CHANDLER.
MARSTON H. KIMBALL.